United States Patent
Korotaev

(10) Patent No.: US 11,409,862 B2
(45) Date of Patent: Aug. 9, 2022

(54) INTRUSION DETECTION AND PREVENTION FOR UNKNOWN SOFTWARE VULNERABILITIES USING LIVE PATCHING

(71) Applicant: Cloud Linux Software Inc., Estero, FL (US)

(72) Inventor: Kirill Korotaev, Moscow (RU)

(73) Assignee: Cloud Linux Software Inc., Estero, FL (US)

( * ) Notice: Subject to any disclaimer, the term of this patent is extended or adjusted under 35 U.S.C. 154(b) by 539 days.

(21) Appl. No.: 16/518,325

(22) Filed: Jul. 22, 2019

(65) Prior Publication Data

US 2021/0026947 A1    Jan. 28, 2021

(51) Int. Cl.
| | | |
|---|---|---|
| *G06F 21/53* | (2013.01) | |
| *G06F 21/55* | (2013.01) | |
| *G06F 21/57* | (2013.01) | |
| *G06F 9/48* | (2006.01) | |
| *G06F 8/656* | (2018.01) | |
| *G06F 9/455* | (2018.01) | |

(52) U.S. Cl.
CPC .............. *G06F 21/53* (2013.01); *G06F 8/656* (2018.02); *G06F 9/45558* (2013.01); *G06F 9/4856* (2013.01); *G06F 21/554* (2013.01); *G06F 21/577* (2013.01); *G06F 2009/4557* (2013.01); *G06F 2009/45587* (2013.01)

(58) Field of Classification Search
CPC ...... G06F 21/53; G06F 8/656; G06F 9/45558; G06F 9/4856; G06F 21/554; G06F 21/577; G06F 2009/4557; G06F 2009/45587
See application file for complete search history.

(56) References Cited

U.S. PATENT DOCUMENTS

| | | | |
|---|---|---|---|
| 6,006,328 A | * | 12/1999 | Drake ................ H04L 63/0428 713/188 |
| 7,412,723 B2 | | 8/2008 | Blake et al. |
| 7,904,959 B2 | | 3/2011 | Sidiroglou et al. |
| 8,181,250 B2 | | 5/2012 | Rafalovich et al. |
| 8,448,247 B2 | | 5/2013 | Stute |
| 8,549,642 B2 | | 10/2013 | Lee |
| 9,350,758 B1 | | 5/2016 | Aharoni et al. |
| 9,923,922 B1 | | 3/2018 | Brown et al. |
| 10,079,024 B1 | * | 9/2018 | Bhimanaik ............. G10L 17/02 |
| 2006/0195745 A1 | * | 8/2006 | Keromytis ......... G06F 11/0742 714/741 |
| 2008/0141374 A1 | * | 6/2008 | Sidiroglou ........... G06F 21/554 726/23 |
| 2017/0339186 A1 | | 11/2017 | Gurvich et al. |
| 2019/0068640 A1 | * | 2/2019 | Araujo ................... G06F 21/53 |
| 2019/0238570 A1 | * | 8/2019 | Mehner ................. G06F 21/55 |

OTHER PUBLICATIONS

Google Scholar Search NPL (Year: 2022).*

* cited by examiner

*Primary Examiner* — Mohammad W Reza
(74) *Attorney, Agent, or Firm* — ArentFox Schiff LLP; Michael Fainberg

(57) ABSTRACT

A variety of methods are provided for an application or operating system (OS) kernel intrusion detection and prevention, based on verification of security invariants and legitimacy of security state transitions from the past historical state. Methods are provided for an application or OS kernel intrusion detection and prevention for unknown attack vectors and vulnerabilities based on additional security checks added to the software by means of live patching.

18 Claims, 4 Drawing Sheets

INTRUSION DETECTION AND PREVENTION FOR UNKNOWN SOFTWARE VULNERABILITIES USING LIVE PATCHING

FIELD OF TECHNOLOGY

The present disclosure relates generally to the field of computer security, more specifically, to systems and methods of intrusion detection and prevention using software patching to create honeypots from computing systems having unknown software vulnerabilities.

BACKGROUND

Security of live information technology (IT) software systems is a challenge. Keeping Operating System (OS) and applications up to date, protecting systems with firewall, web application firewalls and other anomaly or intrusion detection systems help to some extent and makes intruder life harder, yet will never solve the problem.

Looking more deeply to Intrusion Detection Systems (IDS) and Intrusion Prevention Systems (IPS) one may find a lack of collaboration and deep integration between these systems and systems being protected. Generic IDS system may detect statistical behavior anomalies, leading to false positives or follow a set of strict rules, which makes it hard to configure for real life large systems and update as this software evolves over time. Such systems may also exploit honeypot techniques and detect access to fake resources, which should not be normally accessed at all, but intruders are scanning to find further vectors of attacks and thus reveal themselves. Comprehensive honeypots may even provide fake vulnerabilities or vulnerable systems to make attacker spend efforts on those rather than on real systems.

Typical honeypots and IDS/IPS systems are deployed as separate machines, firewalls, or resources on the network, which make it tricky for mass deployment and management by non-professionals. There is also a class of IPS systems running right on the protected systems and traditionally called Anti-Virus software, typically based both on pattern/rule matching and behavioral analysis.

To describe in more details, most of the state of the art and security honeypot techniques are related to the computer networking and network traffic. Some approaches have used a virtual honeypot that is exposed to a network using a security appliance that relays network traffic directed to the virtual honeypot from the security appliance to a server for processing. Other approaches have used scattered IP addresses in a cloud infrastructure. To protect existing systems all non-authorized traffic can be as early as possible routed to production like honeypot servers to detect and mislead attacks. Honeypots can mimic such production servers, and can have similar or special OS, version, etc. Honeypots can also be useful in detecting, handling, or filtering DDoS network attacks. Besides honeypots, many IDS systems perform network traffic analysis to the target systems and filter out malicious requests.

But not only IP addresses and TCP/UDP ports can serve as honeypots detecting scanning of the network infrastructure by an attacker. Much more advanced network systems simulating real-life applications and detecting anomaly access patterns like Active Directory may serve such a purpose, such as in approaches in which a honeypot in a computer network is configured for use with a wide variety of computing resources that are defined by a network administrator or user which may include desktop and network resources such as address book contacts, instant messaging contacts, active directory user accounts, IP addresses, and files that contain particular content or that are stored in particular locations. Such honeypot applications can be fake ones or real services with real vulnerabilities. Even trickier honeypot objects can include a decoy e-mail addresses associated with the spam e-mail honeypot that do not, or no longer, belong to a genuine person or entity. Consequently, such decoy email addresses typically do not receive legitimate e-mails from legitimate senders may be detected using honeypot systems that identify potential malware containing messages whereby a decoy system to receive illegitimate e-mails is established.

Yet only a few methods are available to protect against local code vulnerability attacks. Some of modern programming languages (but C/C++, which are used for OS kernels and other performance critical software) has protection against out of array boundaries access. Stack overflow protection is handled now days best and can be even protected against compile time for C/C++ with fstack-protector GCC. And the worst situation in system programming languages is with "use after free" patterns which incur huge performance penalty if mitigated in runtime (e.g. kernel has an option to unmap unused memory pages and user space applications can be compiled with address sanitizer library or run under valgrind-style supervision—none of these options used in production). OS security systems like SELinux and other Expert systems (also known as rule-based systems or production systems) are difficult to use and configure. Accordingly, there is a need for improvements within in the computer security arts for local-application and kernel intrusion detection and protection.

SUMMARY

The present disclosure relates to the methods of intrusion detection and prevention that substantially obviates one or several of the disadvantages of the related art.

Embodiments of the present disclosure include techniques such as using systems that may have unknown security vulnerabilities as honeypots, i.e. scattered all around detectors of system being tried to exploit and intrusion attempts. Similar to widely used methods of deploying fake network resources acting as honeypots and detecting an attacker presence in the network or even attracting them, such honeypot systems can directly signal about a malicious user trying to attack the software from inside, or signal about how the system may have already been exploited, and the attacker is trying to gain even more control over it, probing new vectors of attacks. Such honeypots do not require additional hardware or separate network machines and can be easily integrated into existing OS and applications by the vendors or applied to a stock system by using live update technologies.

New zero-day or recently-introduced vulnerabilities will be discovered in the large software products from time to time. While keeping systems up-to-date may provide some protection, this is mostly because of the lack of other reliable ways to protect from such yet unknown issues. Moreover, malicious attackers may know these issues already and hide the knowledge, preparing for the future large or specific target attacks. As such, an embodiment of the present disclosure presents a method for Intrusion Detection independent from known honeypot vulnerabilities and working for not-yet discovered exploits in the wild. This technology is based on the observation that after gaining additional privileges attacker always wants to perform some additional actions like executing binaries or accessing privileged data.

By checking security invariance conditions at such actions, we can additionally and securely verify that no expansion of expected privileges has been performed.

All the Intrusion Detection methods of the present disclosure can be used for Intrusion Prevention based on selected reaction of the system. It can be a signal to the administrator about the incident details or a more proactive reaction like termination of the user processes performing the attack attempts or even blocking incoming connections from IP addresses spawned these processes.

According to an exemplary aspect of the present disclosure, a method for software intrusion detection is provided, the method comprising generating a honeypot patch configured to convert a computing system having software, the software comprised of at least one of: an operating system and an application, into a honeypot system, wherein the honeypot patch comprises a live update having program code for detecting an unexpected change to an original data structure of the software and/or CPU registers that represents a system invariant of the computing system, and in response, generating a security event indicating an attempt to exploit a software vulnerability, and modifying the software installed on the computing system using the generated honeypot patch without restarting the software.

In another aspect of the method, modifying the software using the generated honeypot patch comprises adding program code configured to create a new shadow data structure corresponding to the original data structure of the software that represents the system invariant and replacing original program code that refers to the original data structure with program code referring to the shadow data structure.

In another aspect of the method, modifying the software using the generated honeypot patch comprises modifying the program code for detecting the change in a system function of the software.

In another aspect of the method, the modified system function comprises at least one of: a system function related to a file open, a system function related to a process fork, a system function related to a process execution, and a system function related to a process exit.

In another aspect of the method, the honeypot system configured to detect attempts to exploit the software vulnerability of the software is further configured to report the exploit attempts to a system administrator via a notification.

In another aspect of the method, the honeypot system is configured to, in response to detecting attempts to exploit the software vulnerability of the software, kill and block intruder processes.

In another aspect of the method, the honeypot system is configured to, in response to detecting attempts to exploit the software vulnerability of the software, save a state of processes running on the honeypot system for further analysis.

In another aspect of the method, the honeypot system is configured to, in response to detecting attempts to exploit the software vulnerability of the software, live migrate processes associated with the detected attack to an isolated system or a virtual machine.

In another aspect of the method, current or future connections from an attacking address are routed to the isolated system or the virtual machine where the processes were migrated.

In another aspect of the method, the honeypot system is configured to, in response to detecting attempts to exploit the software vulnerability of the software, block a login of a user associated with the detected attack.

In another aspect of the method, the honeypot system is configured to, in response to detecting attempts to exploit the software vulnerability of the software, block at least a portion of network traffic from an original network address associated with the detected attack.

In another aspect of the method, the honeypot system is further configured to, in response to detecting attempts to exploit the software vulnerability of the software, fake to the attacker that the detected attack was successful.

In one exemplary aspect of the present disclosure, a system for software intrusion detection. The system includes a hardware processor configured to generate a honeypot patch configured to convert a computing system having software, the software comprised of at least one of: an operating system and an application, into a honeypot system, wherein the honeypot patch comprises a live update having program code for detecting an unexpected change to an original data structure of the software and/or CPU registers that represents a system invariant of the computing system, and in response, generating a security event indicating an attempt to exploit a software vulnerability and modify the software installed on the computing system using the generated honeypot patch without restarting the software.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for software intrusion detection and prevention using software patching and honeypots. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
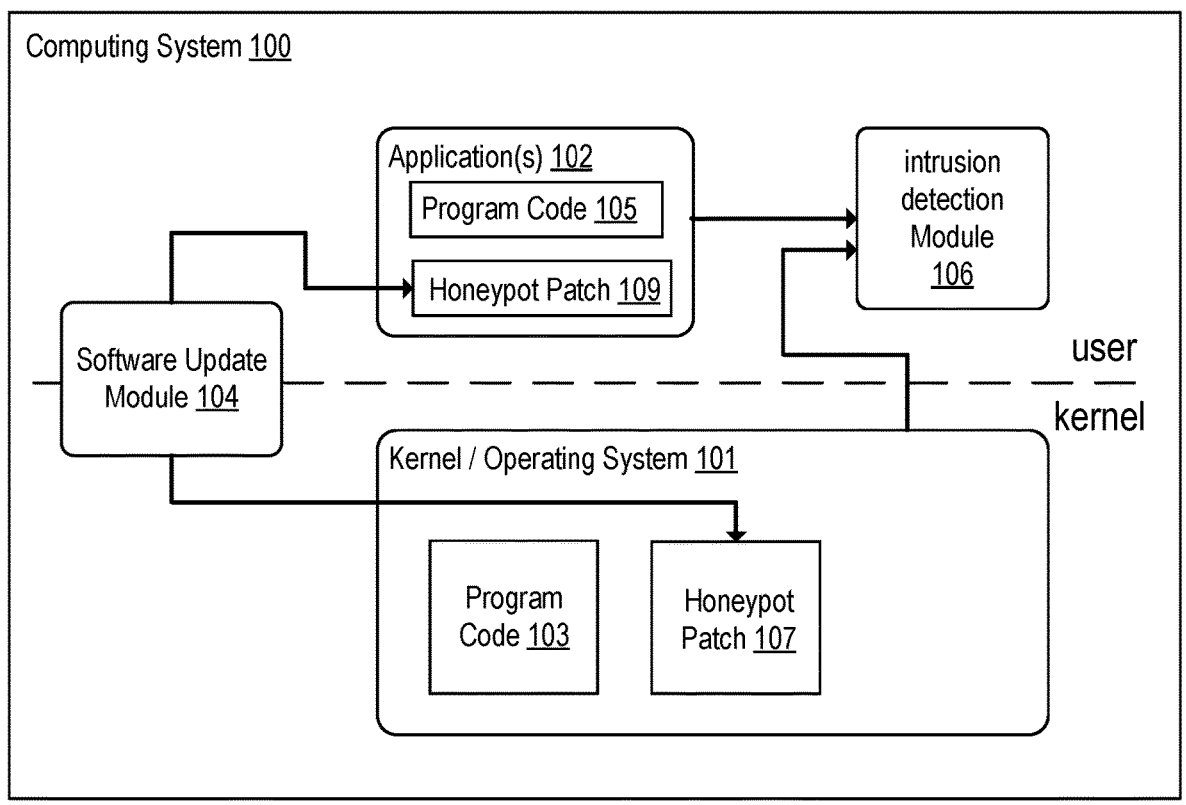
FIG. 1 is a block diagram illustrating a computing system for software intrusion detection according to an exemplary aspect.

FIG. 1 is a block diagram illustrating a computing system 100 for software intrusion detection according to an exemplary aspect. The computing system 100 includes an operating system (OS) 101, which is interchangeably referred to as a kernel, and applications 102 installed thereon. The OS 101 is a type of system software configured to manage the execution of applications 102 and computer hardware resources of the computing system 100, and may include common system services configured to facilitate such execution and management. The operating system 101 and applications 102 may be referred to collectively as the software of the computing system 100. The computing system 100 may be any computing device, physical server, computer server, desktop, laptop, handheld device, tablet device, smartphone, or any other electronic device suitable for executing software program code as described herein.

It is understood that existing large, commercial software, including OS 101 and applications 102, can have many subsystems, APIs, and different security models implemented inside and a large code base, which makes it difficult for any human being to verify correctness and security safety of the software in question. This intrinsic complexity of modern software makes it likely that security issues are discovered over the time by security experts as well as hackers. Those discovered by security experts and software developers are fixed, mostly becoming disclosed to the public via bulletins and are assigned security identifiers (e.g. CVE IDs). However, a large set of software vulnerabilities might be left unknown to security experts and developers, but known to malicious users only. Thus, the set of software security issues can be divided into known (and patchable) issues and unknown issues that are not patched but might be known to malicious actors.

Aspects of the present disclosure are configured to use potentially vulnerable computer systems as an intrusion attack detector or a type of "honeypot" for future intrusion/attack detection and for optionally making a possible attacker believe their attack was successful. A honeypot refers to a type of system that has been configured to be attractive to malicious actors (i.e., software, users). When malicious actors attempt to exploit a honeypot, their attention may be diverted away from other systems (i.e., legitimate, production systems). Moreover, the malicious activity performed on the honeypot may be analyzed/recorded for computer security purposes. In one aspect, live (i.e., production) computing systems can be converted into "honeypots" for yet unknown software vulnerabilities. For purposes of present disclosure, unknown software vulnerabilities may also include so-called "zero-day" vulnerabilities, which may be software security flaws that are known to the software vendor but for which a patch or fix is not ready or available to be used.

A software vulnerability can be manifested in by programming bugs, design flaws, omissions of security checks or input validation, and other types of software errors. It has been determined that when a malicious actor successfully exploits a (known or unknown) software vulnerability, the malicious actor typically performs some actions with the new privileges to get some value out of the exploit. For example, after successfully exploiting a UNIX-like operating system, a malicious process might modify memory of the operating system or other processes, open privileged files, execute a shell or other applications, open sockets, etc. Accordingly, the present disclosure has identified a tightly analyzed set of actions potentially wanted by the malicious actor to use these newly gained privileges. A honeypot system can be configured at various critical code points, which correspond to actions that the malicious actor may want to use, to verify the security conditions. Examples of critical code points may be found in program code in one or more system calls of the operating systems, such as system calls for file open, process fork or execution, exit, and others (e.g., may_open( ) execve( ), do_fork( )and exit( ) setuid( )and family, init_module( ) etc.) The present disclosure provides a discussion of what can be verified in such code points to catch an intruder.

Every computing system may have a (predetermined) set of invariants which are assumed to be true during the whole lifetime of the program. A system can be a set of simple conditions or a historical data obeying strict limitations. For example, it has been determined that, when an operating system has enabled an Intel CPU protected mode, the operating system generally does not switch back to real-mode, except for a limited set of scenarios like in a reboot, etc. In another example, when an operating system enables CPU security features that protect the kernel from using instructions or data from a user-space program, such as a Supervisor Mode Access Prevention (SMAP) feature or a Supervisor Mode Execution Prevention (SMEP) feature in a CPU control register (e.g., CR4 in x86-based system architectures), the system does not turn it back off under normal operations. In another example, after a kernel has write-protected its kernel code and kernel modules, the system does not enable write-ability to these regions. In another example, after (e.g. via checkpoint-restore functionality similar to CRIU project or Virtual Machine snapshots) a Linux kernel security module, such as Security-Enhanced Linux (SELinux) is enabled, the SELinux security module cannot be disabled without a reboot. In another example, after a process drops its privileges or spawned with a limited set of capabilities, the process generally cannot re-gain those privileges, i.e., its UID, GID, EUID, EGID, SUID, SGID, FSUID, FSGID, capability bitmasks, credentials structure and other identifiers obey some security transformation rules. In another example, a process cannot change a namespace (container or Virtual Machine context) once the process got into one from a root namespace until the process has explicit capabilities to do so. In other words, computer security often follows the pattern that privileges can be dropped but not gained. Accordingly, attempts to change a system invariant (such as, turning off a security feature) represents a hacker's attempt to perform an unauthorized escalation of their privileges, and a honeypot system configured to detect such system invariant changes may enable techniques for intrusion detection and prevention of computing systems even though the software vulnerability used to cause the change in system invariant is not known.

In one aspect, the system invariant(s) for a given computing system can be determined using a static code analyzer which deducts what state transitions are possible. In some aspects, the system invariant(s) may additionally or alternatively be determined based on manual annotations (from software developers) contained within program code. Based on this information from an analyzer, it should be possible to write a honeypot monitor code which verifies that certain system invariants still hold true (either periodically or based on events).

Known approaches to monitoring the conditions of a computing system, such as kernel probe-based mechanisms (e.g., kprobes), have known drawbacks. The probe handlers of a kernel probe facility are run with preemption disabled or interrupt disabled, which depends on the architecture and optimization state. For example, kretprobe handlers and optimized kprobe handlers are better and run without interrupt disabled on x86/x86-64 architectures. Yet such handlers should not yield the CPU (e.g., by attempting to acquire a semaphore, or waiting I/O). Kprobes are also not capable to insert check conditions in the middle of functions nor modify the state and may miss the probe call under high load. One of kprobes' limitations is its inability to reliably monitor changes of the critical variables like selinux_enabled and selinux_enforcing. These variables are often modified by exploits to disable SELinux kernel security subsystem and penetrate further into the system. A monitor based on kprobes can watch these variables state only periodically, and will likely miss the instance in which the variables are briefly changed by an intruder (e.g., for microseconds) before gaining additional privileges and are changed back to their previous value afterwards. Aspects of the present disclosure that use a honeypot-based system that overcome these problems and additionally provide for a reliable honeypot detectors for global variable changes as follows.

According to an aspect, the system 100 may include a software update module 104 and an intrusion detection module 106. The software update module 104 may be configured to generate software patches, referred to herein as honeypot patches, that are configured to convert a computing system that might have an unknown software vulnerability into a honeypot system. In one aspect, the honeypot patch may be comprised of honeypot monitor code for performing intrusion detection based on security invariants verification, (either periodically or event driven). The honeypot patch 107 and/or 109 replaces and/or adds to the program code 103 and/or 105 of software (e.g., the operating system 101 and/or user applications 102, respectively) that encompasses one or more system invariants. In one aspect, the honeypot patch is a live update having program code for instantiating one or more (new) shadow data structures corresponding to original data structure(s) of the computing system that represents system invariant(s) of the computing system, and program code that will replace original program code of the system that refers to the original data structure with program code that instead refers to the shadow data structure. As a result of application of the honeypot patch, the modified system no longer uses the original data structure. The honeypot patch further includes program code configured to detect a change to the original data structure (i.e., indicative of the computing system being hacked), and in response, generate a security event indicating an attempt to exploit a software vulnerability, such as an unknown software vulnerability.

The intrusion detection module 106 is configured to detect attempted changes to the system invariants (which would occur after an unknown software vulnerability has already been exploited), and in response to detecting such an attempt, generate or trigger a security event associated with an unknown software vulnerability. The intrusion detection module 106 is configured to react accordingly to the exploit attempts detected by the honeypot patch.

In one aspect, the honeypot patch is created as a "live" patch that is applied to the original running software system using live patching techniques (also referred to as hot patching or dynamic software updates) without need for its restart. In some aspects, the honeypot patch can be implemented with a live update binary that is generated as follows. Program code that is configured to detect attempts to exploit a software vulnerability is merged with the original source code of the software to form modified source code. For example, we can take a latest operating system release and add a honey pot patch to it.

A software build system is modified to make a compilation go through via intermediate stage, rather than directly to final object code (i.e., before generating final object code we may have intermediate stages with non-final object code). An analysis and comparison of the original and the modified intermediate (assembler, object or some other Intermediate Representation-IR) code results in the generation of the new, "Instrumented" intermediate (assembler, object or other IR) code. This instrumented intermediate (assembler, object or other IR) code is constructed in such a way that, if compiled and/or linked, it produces the resulting file with optionally the original binary code and a code for the honeypot update (which may address the software vulnerability if applied to vulnerable versions of the software and adds detection capability) in the very same file, including the information about which original code blocks should be replaced with new ones. The resulting file can be an object file (e.g., a Linux ELF file or some other platform-specific object file) with relocations information and sections. This technique and other examples of similar techniques for creating a live update is described in further detail in U.S. Pat. No. 9,696,989, which is herein incorporated by reference, and can be extended for use in creating a honeypot patch for modifying vulnerable software systems into honeypot systems.

In one aspect, the software update module 104 may be arranged in a two-component form, comprised of a patch management subcomponent and an update subcomponent. The patch management subcomponent (e.g., executing in user-level space) may be configured to create or retrieve from a predetermined library or data store one or more honeypot patches based on known system invariants associated with the existing applications and/or operating system installed on the computing system. The update subcomponent (e.g., executing as a kernel module) may be configured to execute a live patching mechanism that alters the workings of the operating system kernel 101 and/or the user applications 102 as they are executing without requiring a restart of the software. Aspects of the present disclosure extend to other configurations of the software update module 104, including a single monolithic system service (e.g., executing in privileged or user level) or a micro-service based configuration.

In general, the term "module" as used herein can refer to a software service or application executed as part of the operating system 101. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer.

Accordingly, each module can be realized in a variety of suitable configurations, and should not be limited to any example implementation described herein.

Figure 2A:
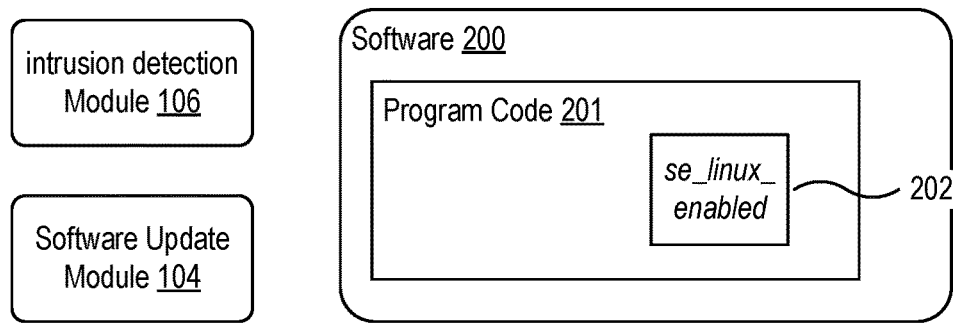
FIGS. 2A to 2C are block diagrams illustrating operations for the intrusion detection and prevention system based on honeypots, where honeypot detector reports about intrusion attempts to a reaction module according to an exemplary aspect.
Figure 2B:
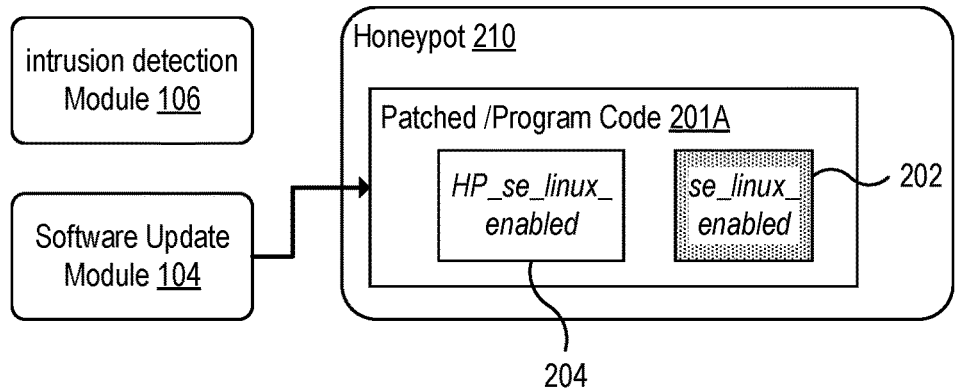
Figure 2C:
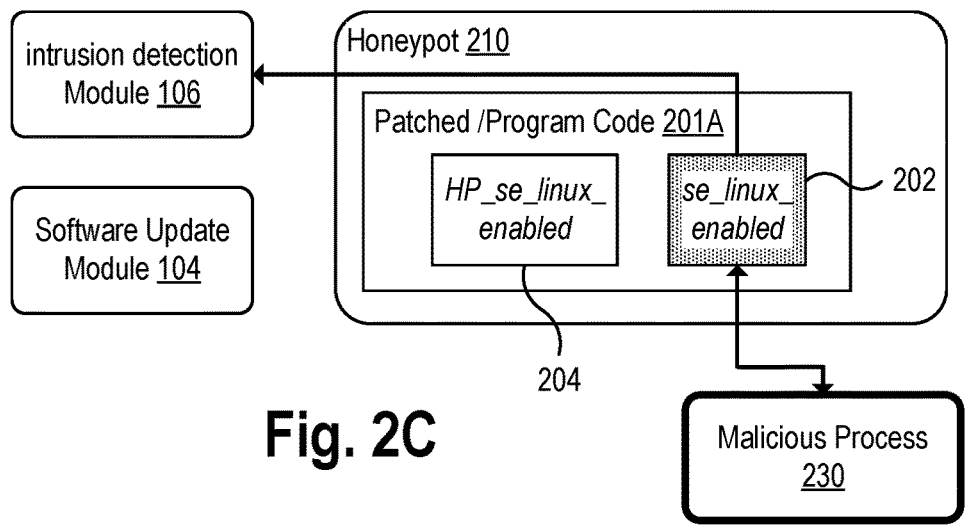

FIGS. 2A to 2C are block diagrams illustrating operations for the intrusion detection and prevention system based on honeypots, where honeypot detector reports about intrusion attempts to an intrusion detection module according to an exemplary aspect. As shown in FIG. 2A, the software update module 104 may determine one or more system invariants associated with (running) software 200 comprised of program code 201 that utilizes at least one data structure or variable 202 corresponding to a system variant. In some aspects, the software update module 104 may identify the system invariants associated with the software 200 based on a comparison of the software with a library or data store of software information and known system features and invariants. The software update module 104 may check identifiers or other metadata associated with the software 200 (e.g., software name, software publisher, version number) against the library of known software invariants. For example, the software update module 104 may determine that the installed software 200 is a version of the software that contains a known system invariant related to a security feature (e.g., se_linux_enabled) according to the library.

As depicted in FIG. 2B, the software update module 104 generates or retrieves a prepared honeypot patch 105 and modifies the (running) software using the honeypot patch 105 so as to convert the software 200 into a honeypot system 210. To make a reliable honeypot for a particular variable 202, the software update module 104 may create a patch that introduces a new "shadow" variable to which all legitimate changes from the existing code 201 will go. This may be achieved with live patching by adding a new variable 204 (either global or in shadow data structures) in the live patch and modifying the existing code 201 (thereby creating patched code 201A) to use this shadow (new) variable 204 instead of the original variable instance 202. So, as depicted in FIG. 2C, even if a malicious actor was able to find the memory address of the variable (e.g., original variable 202) they were interested in and modified that variable, they will not be able to make use out of that variable because the patched code 201A no longer utilizes that original variable. Such approach not only allows the system to detect an intrusion but to prevent the intrusion by fooling the intruder.

After a live update is applied to the program code 201, the original variable 202 is no longer used by the patched/ program code 201A. The honeypot patches effectively replaces the original variable with a shadow one (variable 204) and all code accessing the original variable is replaced with code accessing the shadow one. As such, the reading of the original variable is not performed by any entity after that (except for the honeypot monitor code that checks but does not change the original variable). In some aspects, the original variable instance (or more strictly its page) can be write-protected to catch its modification attempts in real-time. If the page contains other variables that are modified frequently, they can be shadowed as well to avoid page fault penalties. In some aspects where the system invariant is implemented by one or more CPU registers (e.g., a security feature enabled by setting a particular register bit), the honeypot monitor code may poll the particular CPU register periodically to verify the system invariant still holds true.

In one aspect, the honeypot patch may be further configured to insert honeypot monitor program code into certain key code points of the program code 201 that checks whether the original variable or state has been changed in forbidden manner (as would occur during a cyberattack). The honeypot monitor program code can be inserted into one or more system calls or functions that might be invoked by malicious software that has exploited the software 200. For example, the honeypot monitor program code can be inserted into kernel functions related to files open (e.g., "may_open( )"), as opening different files is typically done by a malicious process to load additional malicious data, payloads, processes, etc. In other examples, the honeypot monitor program code can be inserted into a system call or functions for executing a process found at a particular pathname (e.g., "execve( )"), or a call for spawning new processes (e.g., "do_fork( )"), and other system functions for security and performing actions which must be carefully secured (e.g., exit( ) setuid( )and family, and init_module( ).

In one example, the software update module 104 may determine that the software 200 is a Linux system that has enabled a kernel security module, which uses security features to provide access control security policies, such as SELinux. This security feature is represented by a system variable se_linux_enabled whose Boolean value corresponds to whether the feature is enabled or disabled. As shown in FIG. 2B, the honeypot patch creates a new variable HP_se_linux_enabled (leaving the instantiation of the original variable in place) and replaces all references to the original variable "se_linux_enabled" with new shadow variable "HP_se_linux_enabled." The honeypot patch then inserts program code into the do_fork( ) system call that checks whether the value of the original se_linux_enabled variable has been changed. If so, then a security event can be triggered. Example pseudocode for a honeypot patch is shown in Listing 1 below.

```
@@ line diff @@ /kernel/system.c
        var se_linux_enabled;
    +   var HP_se_linux_enabled;   // create new shadow variable
@@ line diff @@ /kernel/library.c
    ...
    -       if (se_linux_enabled) {
    +       if (HP_se_linux_enabled) {   // replace instance
@@ line diff @@ /kernel/fork.c
        function _do_fork(clone_flags, stack_start, stack_size, *parent_tidptr,
        *child_tidptr, tls) {
    ...
    +       if (se_linux has changed) {   // honepot trap check
    +           KHONEY_EVENT("Unknown software exploit intrusion detected");
    +           return -EINVAL;
    +       }
    ...
```

Listing 1: Example Pseudocode for Honeypot Patch

As shown in FIG. 2C, the honeypot system 210 may receive an attempt to exploit an unknown software vulnerability, for example, by a malicious process 230 executing on the same computing system 100 or a different system (e.g., over a network). This exploit attempt may include attempts to change one or more system variables 202 to escalate their privileges or disable currently-enabled security features. Because the honeypot patch has introduced the shadow variable, such escalation attempts will be stopped, and in addition, will be detected by the honeypot monitor program code of the honeypot patch. During its execution, the honeypot instance of the software executes the program code of the honeypot patch, e.g., triggers the security event to be generated (i.e., via KHONEY_EVENT( ). These security events are collected by the intrusion detection module 106 as detected exploit attempts.

In one aspect, the detected exploit attempts are reported to the system administrator via notifications or by other means. In some aspects, the detected exploit attempts are proactively mitigated by killing and blocking intruder processes. In this example, the intrusion detection module 106 may be configured to terminate the malicious process 230 and/or block future inter-process communications from that process 230. In some aspects, the intrusion detection module 106 may be configured to, in response to detecting the exploit attempts, saves the state of the processes for further analysis (e.g. via checkpoint-restore functionality similar to checkpoint restore in userspace project, referred to as CRIU, or Virtual Machine snapshots). In some aspects, the intrusion detection module 106 may be configured to, in response to detecting the exploit attempts, live migrate the processes associated with the attack or attacking user to an isolated system or virtual machine (for further analysis and/or sandboxing).

Live patching system can be further enhanced to automatically generate verification of shadow and original variable instances in code where it is used, removing the need for manual checks depending on software version and making the whole process of monitor maintenance automated. To do so, the system 100 can utilize a list of variable names (e.g. var1, var2, . . . ) to be hidden by their shadows and the live patching system will generate new variables of the same type (var1_shadow, var2_shadow, . . . ) and replace all references in existing code to old variables with new counterparts, i.e. generate new code referencing new variables. Such variables can be either global as 'selinux_enabled' variable in previous examples or inside other (dynamically allocated) data structures. After that, honeypot monitor code should only patiently watch and detect if original variables are suddenly changed. Though in some aspects variable shadowing and verification is described, other states may be verified by a monitoring process or the like. For example a process monitor may observe that a process that has no administrative privileges has suddenly gained additional privileges, or the like.

Figure 3:
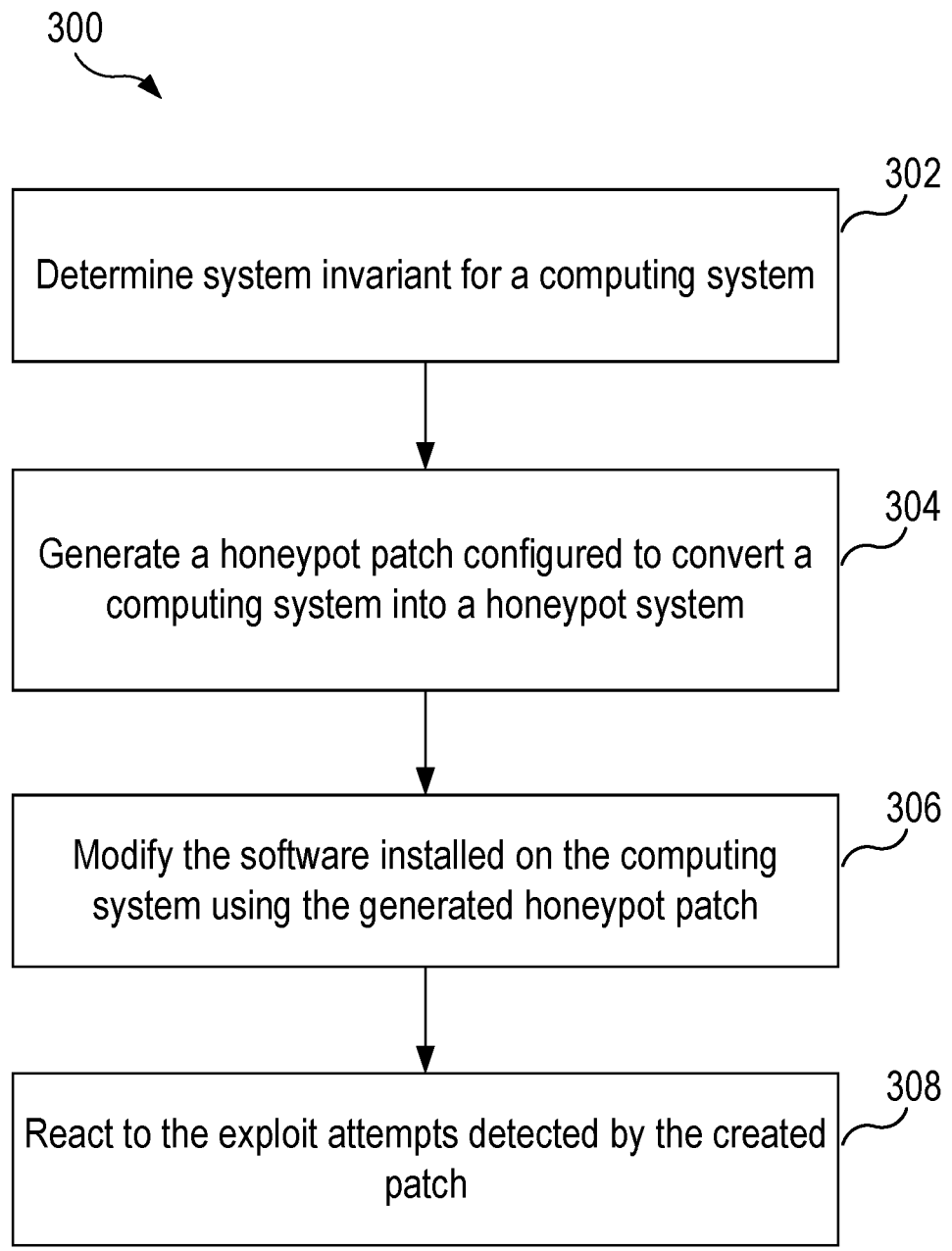
FIG. 3 is a flowchart illustrating a method for software intrusion detection according to an exemplary aspect.

FIG. 3 is a flowchart illustrating a method 300 for software intrusion detection according to an exemplary aspect. It is noted that the following description of the exemplary method makes reference to the system and components described above.

The method 300 includes block 302, where the software update module 104 may determine one or more system invariants associated with a computing system. In some aspects, the software update module 104 may determine software invariants associated with software (e.g., applications and/or the operating system) installed on a computing system based on an application identifier, a version number of the corresponding software application and/or operating system, etc.

In one aspect, the system invariant may include one or more variables representing a CPU protected mode (e.g., Intel CPU protected mode). In another aspect, the system invariant may include one or more variables representing a CPU security feature that protects a kernel from using instructions or data from a user-space program, such as a Supervisor Mode Access Prevention (SMEP) feature or a Supervisor Mode Execution Prevention (SMEP) feature in a control register (e.g., CR4 in x86-based system architectures). In another aspect, the system invariant may include variables representing write-protection of a kernel and its kernel modules. In another aspect, the system invariant may include one or more variables representing an enabled Linux kernel security module, such as Security-Enhanced Linux (SELinux). In another aspect, the system invariant may include variables representing that a process has dropped its privileges or spawned with a limited set of capabilities (e.g., its UID, GID, EUID, EGID, SUID, SGID, FSUID, FSGID, capability bitmasks, credentials structure and other identifiers that obey security transformation rules). In another aspect, the system invariant may include variables representing a change in namespace from a root namespace (container or Virtual Machine context).

At block 304, the software update module 104 may generate a honeypot patch configured to convert a computing system having software into a honeypot system. The software may be an operating system of the computing system, one or more applications, or a combination of both. The honeypot patch comprises a live update having program code for detecting a change to an original data structure of the operating system or CPU registers that represents a system invariant of the computing system, and in response, generating a security event indicating an attempt to exploit a software vulnerability.

At block 306, the software update module 104 may modify the software installed on the computing system using the generated honeypot patch without restarting the software. In some aspects, the modifying the software using the generated honeypot patch may include adding program code configured to create a new shadow data structure corresponding to the original data structure of the software that represents the system invariant. Then, the modification involves replacing original program code that refers to the original data structure with program code referring to the shadow data structure. The modification may include inserting the program code for detecting the change is inserted into a system functions of the software. The system functions may be at least one of: a system call for a file open or functions involved in handling the call, system functions related to a process fork, system functions for a process execution, and a system functions for a process exit.

At block 308, the intrusion detection module 106 may react to the exploit attempts detected by the created patch (and modified software). In some aspect, the detected exploit attempts are reported to the system administrator via notifications or by other means. In some aspects, the detected exploit attempts are proactively mitigated by killing and blocking intruder processes. In some aspects, when exploit attempts are detected, the system saves the state of the processes for further analysis. In some aspects, when exploit attempts are detected, the processes associated with the attack or attacking user are transparently live migrated to an isolated system or virtual machines. In such aspects, the current or future connections from the attacking address are routed to the isolated system where the application has been migrated. In another aspect, the detected exploit attempts result in the blocking of the login of the user associated with the attack. In some aspects, the detected exploit attempts result in the blocking of network traffic (all or partial) from the original network address(es) associated with the attack.

In some aspects, the detected exploit attempts are faked to be successful to the attacker or even faked to gain the privileges. That is, the honeypot patch contains program code that configures the software behavior of the (resulting) honeypot system so as to simulate, act, and/or appear as if the attack was successful. For example, the honeypot system may report to the attacker that they received elevated privileges (but refrain from providing such privileges in reality). Or, in another example, the honeypot system may add additional privileges but isolate all the processes in some sandbox form (e.g., virtual machine system, container) to limit further attack vectors. As a result, the intruder will believe that they successfully penetrated the system, and spend additional time on (useless) activity with respect to the honeypot system.

In one aspect, the additional security checks added by the honeypot patch may be configured to periodically verify that critical CPU registers (MSRx, CRx, IDT etc.) has not changed their value in unexpected way. In another aspect, the additional invariant to be monitored by the honeypot patch includes verifying the integrity (i.e., authenticity) of the code based on its checksums or signature. In another aspect, the additional security checks added by the honeypot patch may be configured to verify that a process with no administrative privileges has not unexpectedly obtained more privileges over time. In some aspects, elevated privileges may also include obtaining UID=0 (e.g., the process is executing as a root user in UNIX based operating systems). By tracking processes and their past states, the aspects described herein can verify whether processes have obtained their current state via legitimate transitions or not. In another aspect, the additional critical security variables are moved to shadow counterparts preventing their malicious modification resulting in privileges escalation.

Figure 4:
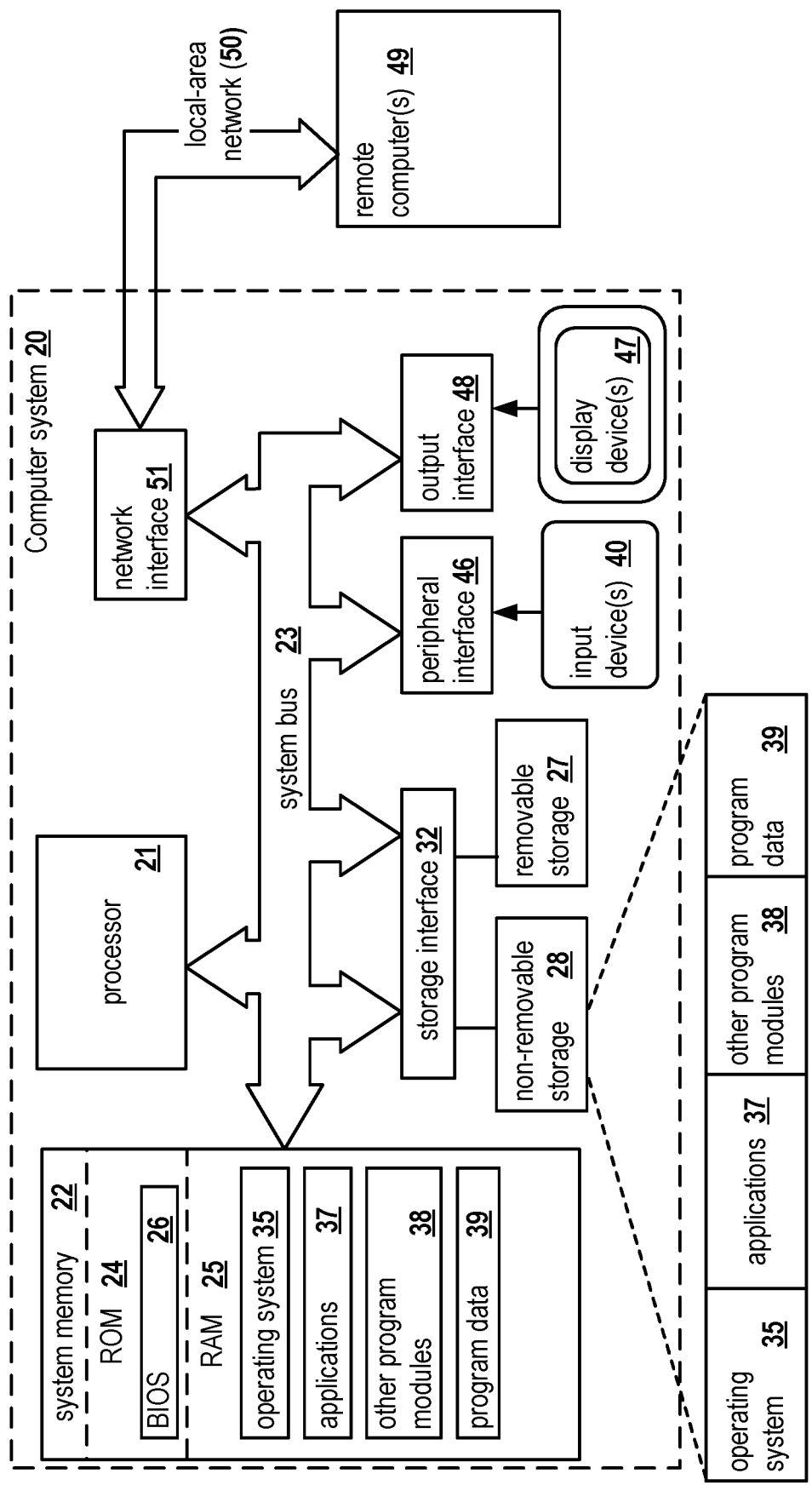
FIG. 4 is a block diagram of a computer system on which the disclosed system and method can be implemented according to an exemplary aspect.

FIG. 4 is a block diagram illustrating a computer system 20 on which aspects of systems and methods for software intrusion detection may be implemented in accordance with an exemplary aspect. It should be noted that the computer system 20 can correspond to the computing system 100, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure.

The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for software intrusion detection, comprising:
generating a honeypot patch configured to convert a computing system having software, the software comprised of at least one of: an operating system and an application, into a honeypot system,
wherein the honeypot patch comprises a live update having program code for detecting an unexpected change to an original data structure of the software and/or CPU registers that represents a system invariant of the computing system, and in response, generating a security event indicating an attempt to exploit a software vulnerability; and modifying the software installed on the computing system using the generated honeypot patch without restarting the software by:

adding program code configured to create a new shadow data structure corresponding to the original data structure of the software that represents the system invariant; and replacing original program code that refers to the original data structure with program code referring to the shadow data structure without removing an instantiation of the original data structure.

2. The method of claim 1, wherein modifying the software using the generated honeypot patch comprises:

modifying the program code for detecting the change in a system function of the software.

3. The method of claim 2, wherein the modified system function comprises at least one of: a system function related to a file open, a system function related to a process fork, a system function related to a process execution, and a system function related to a process exit.

4. The method of claim 1, wherein the honeypot system configured to detect attempts to exploit the software vulnerability of the software is further configured to report the exploit attempts to a system administrator via a notification.

5. The method of claim 1, wherein the honeypot system is configured to, in response to detecting attempts to exploit the software vulnerability of the software, kill and block intruder processes.

6. The method of claim 1, wherein the honeypot system is configured to, in response to detecting attempts to exploit the software vulnerability of the software, save a state of processes running on the honeypot system for further analysis.

7. The method of claim 1, wherein the honeypot system is configured to, in response to detecting attempts to exploit the software vulnerability of the software, live migrate processes associated with a detected attack to an isolated system or a virtual machine.

8. The method of claim 7, wherein current or future connections from an attacking address are routed to the isolated system or the virtual machine where the processes were migrated.

9. The method of claim 1, wherein the honeypot system is configured to, in response to detecting attempts to exploit the software vulnerability of the software, block a login of a user associated with a detected attack.

10. The method of claim 1, wherein the honeypot system is configured to, in response to detecting attempts to exploit the software vulnerability of the software, block at least a portion of network traffic from an original network address associated with a detected attack.

11. The method of claim 1, wherein the honeypot system is further configured to, in response to detecting attempts to exploit the software vulnerability of the software, fake to an attacker that a detected attack was successful.

12. A software intrusion detection system, comprising:

a hardware processor configured to:

generate a honeypot patch configured to convert a computing system having software, the software comprised of at least one of: an operating system and an application, into a honeypot system, wherein the honeypot patch comprises a live update having program code for detecting an unexpected change to an original data structure of the software and/or CPU registers that represents a system invariant of the computing system, and in response, generating a security event indicating an attempt to exploit a software vulnerability; and modify the software installed on the computing system using the generated honeypot patch without restarting the software by:

adding program code configured to create a new shadow data structure corresponding to the original data structure of the software that represents the system invariant; and replacing original program code that refers to the original data structure with program code referring to the shadow data structure without removing an instantiation of the original data structure.

13. The software intrusion detection system of claim 12, wherein the hardware processor, in modifying the software using the generated honeypot patch, is further configured to:

modify the program code for detecting the change in a system function of the software.

14. The software intrusion detection system of claim 13, wherein the modified system function comprises at least one of: a system function related to a file open, a system function related to a process fork, a system function related to a process execution, and a system function related to a process exit.

15. The software intrusion detection system of claim 12, wherein the honeypot system configured to detect attempts to exploit the software vulnerability of the software is further configured to report the exploit attempts to a system administrator via a notification.

16. The software intrusion detection system of claim 12, wherein the honeypot system is configured to, in response to detecting attempts to exploit the software vulnerability of the software, kill and block intruder processes.

17. The software intrusion detection system of claim 12, wherein the honeypot system is configured to, in response to detecting attempts to exploit the software vulnerability of the software, save a state of processes running on the honeypot system for further analysis.

18. A non-transitory computer readable medium comprising computer executable instructions for software intrusion detection, including instructions for:

generating a honeypot patch configured to convert a computing system having software, the software comprised of at least one of: an operating system and an application, into a honeypot system, wherein the honeypot patch comprises a live update having program code for detecting an unexpected change to an original data structure of the software and/or CPU registers that represents a system invariant of the computing system, and in response, generating a security event indicating an attempt to exploit a software vulnerability; and modifying the software installed on the computing system using the generated honeypot patch without restarting the software by:

adding program code configured to create a new shadow data structure corresponding to the original data structure of the software that represents the system invariant; and replacing original program code that refers to the original data structure with program code referring to the shadow data structure without removing an instantiation of the original data structure.

* * * * *